United States Patent
Walsh

(10) Patent No.: US 7,296,060 B2
(45) Date of Patent: *Nov. 13, 2007

(54) SYSTEM AND METHOD FOR AUTOMATICALLY IDENTIFYING AND ATTACHING RELATED DOCUMENTS

(75) Inventor: Thomas E. Walsh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 772 days.

This patent is subject to a terminal disclaimer.

(21) Appl. No.: 09/220,910

(22) Filed: Dec. 24, 1998

(65) Prior Publication Data

US 2002/0107924 A1    Aug. 8, 2002

(51) Int. Cl.
*G06F 15/16* (2006.01)

(52) U.S. Cl. ...................... 709/208; 715/500

(58) Field of Classification Search ............... 709/206, 709/265, 218, 219, 217, 203, 236; 707/101, 707/200, 3, 501, 10, 500; 702/108; 379/88.17, 379/88.23; 345/733; 700/87; 705/408; 715/716, 835
See application file for complete search history.

(56) References Cited

U.S. PATENT DOCUMENTS

| | | | | |
|---|---|---|---|---|
| 5,349,518 A * | 9/1994 | Zifferer et al. | ................. | 700/87 |
| 5,363,487 A * | 11/1994 | Willman et al. | ................ | 710/8 |
| 5,371,885 A * | 12/1994 | Letwin | ....................... | 707/205 |
| 5,416,901 A * | 5/1995 | Torres | ....................... | 715/835 |
| 5,442,742 A * | 8/1995 | Greyson et al. | ............ | 715/539 |
| 5,526,520 A * | 6/1996 | Krause | ....................... | 707/104 |
| 5,603,020 A * | 2/1997 | Hashimoto et al. | ......... | 707/200 |
| 5,644,334 A * | 7/1997 | Jones et al. | .................. | 345/419 |
| 5,647,002 A * | 7/1997 | Brunson | ...................... | 709/206 |
| 5,657,507 A * | 8/1997 | Wasak | ......................... | 709/206 |
| 5,784,177 A * | 7/1998 | Sanchez et al. | ............. | 358/468 |
| 5,870,089 A * | 2/1999 | Fabbio et al. | ............... | 345/733 |
| 5,894,506 A * | 4/1999 | Pinter | ...................... | 379/88.23 |
| 5,905,863 A * | 5/1999 | Knowles et al. | ........... | 709/206 |
| 5,907,850 A * | 5/1999 | Krause et al. | .............. | 707/501 |
| 5,953,684 A * | 9/1999 | Alexander | ................... | 702/108 |
| 5,956,484 A * | 9/1999 | Rosenberg et al. | ......... | 709/203 |
| 5,973,692 A * | 10/1999 | Knowlton et al. | .......... | 715/835 |
| 6,073,165 A * | 6/2000 | Narasimhan et al. | ....... | 709/206 |
| 6,092,104 A * | 7/2000 | Kelly | ......................... | 709/206 |
| 6,094,649 A * | 7/2000 | Bowen et al. | ................. | 707/3 |
| 6,173,274 B1 * | 1/2001 | Ryan, Jr. | .................... | 705/408 |
| 6,173,324 B1 * | 1/2001 | D'Souza | .................... | 709/224 |

(Continued)

OTHER PUBLICATIONS

Thomas, Digital toolbox: Controlling interests, IEEE 1997.*
Thomas, Digital toolbox: E-mail Attachments: Finding the right fit, IEEE 1997.*

*Primary Examiner*—Thong Vu
(74) *Attorney, Agent, or Firm*—Kenyon & Kenyon LLP

(57) ABSTRACT

A system and method for attaching a related document to a primary document which includes at least one word. The system includes a processor determining whether the plurality of words in the primary document includes an indicator that the related document should be attached to the primary document. If an indicator is detected, the related document is then attached to the primary document for further processing. The processor may also identify at least one of a filename and a location of the related document to provide further functionality. Thus, the present invention substantially reduces the likelihood of the primary document being unintentionally processed without the related document attached thereto.

36 Claims, 7 Drawing Sheets

U.S. PATENT DOCUMENTS

| | | | |
|---|---|---|---|
| 6,199,115 B1 * | 3/2001 | DiRienzo | 709/236 |
| 6,233,318 B1 * | 5/2001 | Picard et al. | 379/88.17 |
| 6,240,414 B1 * | 5/2001 | Beizer et al. | 707/8 |
| 6,240,429 B1 * | 5/2001 | Thornton et al. | 715/500 |
| 6,256,666 B1 * | 7/2001 | Singhal | 709/217 |
| 6,275,848 B1 * | 8/2001 | Arnold | 709/206 |
| 6,324,587 B1 * | 11/2001 | Trenbeath et al. | 719/310 |
| 6,327,612 B1 * | 12/2001 | Watanabe | 709/206 |
| 6,374,246 B1 * | 4/2002 | Matsuo | 707/10 |
| 6,452,610 B1 * | 9/2002 | Reinhardt et al. | 715/716 |
| 6,466,968 B2 * | 10/2002 | Shirai et al. | 709/206 |
| 7,025,209 B2 * | 4/2006 | Hawkins | 209/217 |
| 2001/0026487 A1 * | 10/2001 | Koga | 365/202 |
| 2001/0042093 A1 * | 11/2001 | Shirai et al. | 709/201 |

* cited by examiner

SYSTEM AND METHOD FOR AUTOMATICALLY IDENTIFYING AND ATTACHING RELATED DOCUMENTS

INTRODUCTION

The present invention pertains to document management systems. More particularly, the present invention pertains to a system and method for automatically identifying and attaching a related document to a primary document.

BACKGROUND INFORMATION

Electronic mail ("e-mail") provides a fast, cost-efficient and increasingly more reliable manner for sending messages electronically instead of sending hard copies of letters. This results in savings due to the reduction of resources required to deliver the hard copies such as, for example, paper, delivery personnel and mechanisms, etc. Thus, e-mail is rapidly becoming one of the most commonly used methods of communication. And as e-mail has become more popular, software developers have attempted to increase the functionality and ease-of-use of the software used to compose and handle e-mail.

An invaluable feature of almost all e-mail software is the ability to attach secondary documents to an e-mail and send both the e-mail and the secondary document to a recipient. The secondary document may be a spreadsheet file, a database file, etc., that was created in a separate software program. When the e-mail is received, the recipient may then detach the secondary document and save it to a separate file. The recipient may then open up the secondary document in whatever software program that was used to create the secondary document or that is compatible.

For example, a user X may be working on a spreadsheet for a budget and need to send the spreadsheet to a user Y, who may be at a remote location, to use in preparing a report. Of course, X could print out the report and send the printout to Y. This would utilize resources such as the paper on which the spreadsheet would be printed and incur costs involved in whatever delivery mechanism is used to deliver the printout. It would be more efficient and faster to use e-mail. Accordingly, X may prepare an e-mail message notifying Y that the spreadsheet file has been attached. X would then have to use either the appropriate keyboard commands or menu-driven commands for the specific e-mail program to attach the spreadsheet file to the e-mail message. This may involve selecting, via a mouse, the menu command "File," selecting "Attach," and then choosing the appropriate file to attach.

This example illustrates a fundamental shortcoming with conventional e-mail programs in that the user must remember to attach the secondary document to the e-mail message. It is not an uncommon problem that a user completely forgets, for various reasons, to attach the secondary document before sending the e-mail. As a result, the user will then have to send a second e-mail with the attached secondary document, which requires additional time and consumes computer resources for the user, the recipient, the user's and recipient's local network and the Internet or intranet.

SUMMARY OF THE INVENTION

The present invention provides a system and a method for automatically attaching a related secondary document to a primary document.

In accordance with an exemplary embodiment of the present invention, a processor processes a primary document containing at least one word to determine whether the primary document contains an indicator that a secondary document should be attached to the primary document. If the processor detects such an indicator, the processor may then identify the secondary document.

The detection, and prompting operations performed by the processor may be automatic so that the operations may be performed without being initiated by the user. However, in a further exemplary embodiment, the user may disable these operations by the processor with an appropriate configuration command.

In accordance with the present invention, the indicator may include several different types of indicators. In a first exemplary embodiment, the indicator may be one of several individual word or character that typically indicate that a secondary document should be attached. In a second exemplary embodiment, the indicator may be one of a plurality of phrases that may typically indicate that a secondary document should be included. In a third exemplary embodiment, the existence of an indicator may be determined by using syntactic processing (otherwise known as natural language processing).

In addition, the present invention may enable the user to add additional terms or phrases to the possible indicators to personalize the system or method for each specific user. Thus, the present invention may allow a user that employs terminology or characters that may not be commonly used. Furthermore, once the system or method according to the present invention determines that a secondary document should be attached, the system or method may also determine either a potential filename or location of the secondary document.

The present invention, including its features and advantages, will become more apparent from the following detailed description with reference to the accompanying drawings.

DETAILED DESCRIPTION

Figure 1:
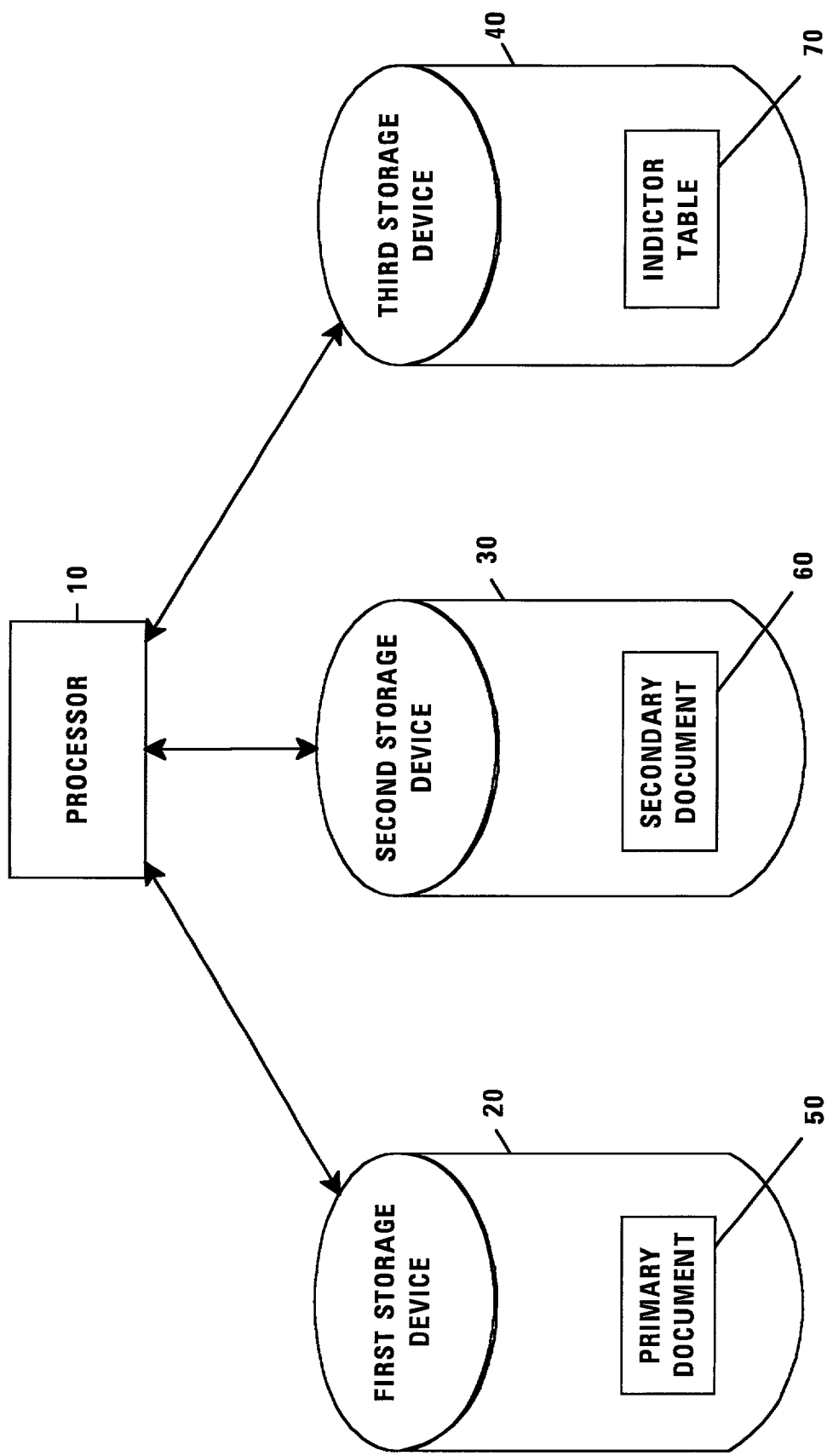
FIG. 1 shows an exemplary embodiment of a system according to the present invention.

FIG. 1 shows an exemplary embodiment of a system according to the present invention which includes a processor 10 coupled to a first storage device 20, a second storage device 30 and a third storage device 40. First storage device 20 may store a primary document 50 having at least one word. Second storage device 30 may store a secondary document 60. Third storage device 40 may store an indicator table (or database) 70 containing a plurality of indicators. Of course, all of the information stored on first, second and third storage devices 20, 30, 40 may also be stored on a single storage device without departing from the scope of the present invention.

The plurality of indicators may include a plurality of predetermined words that are typically used to indicate that a related document should be attached to primary document 50. Some examples of predetermined words include "attached," "enclosed," "included," and "attachment." Those skilled in the art will understand that these are merely examples and that other words or characters may be included in the plurality of indicators without departing from the scope of the present invention.

Figure 2:
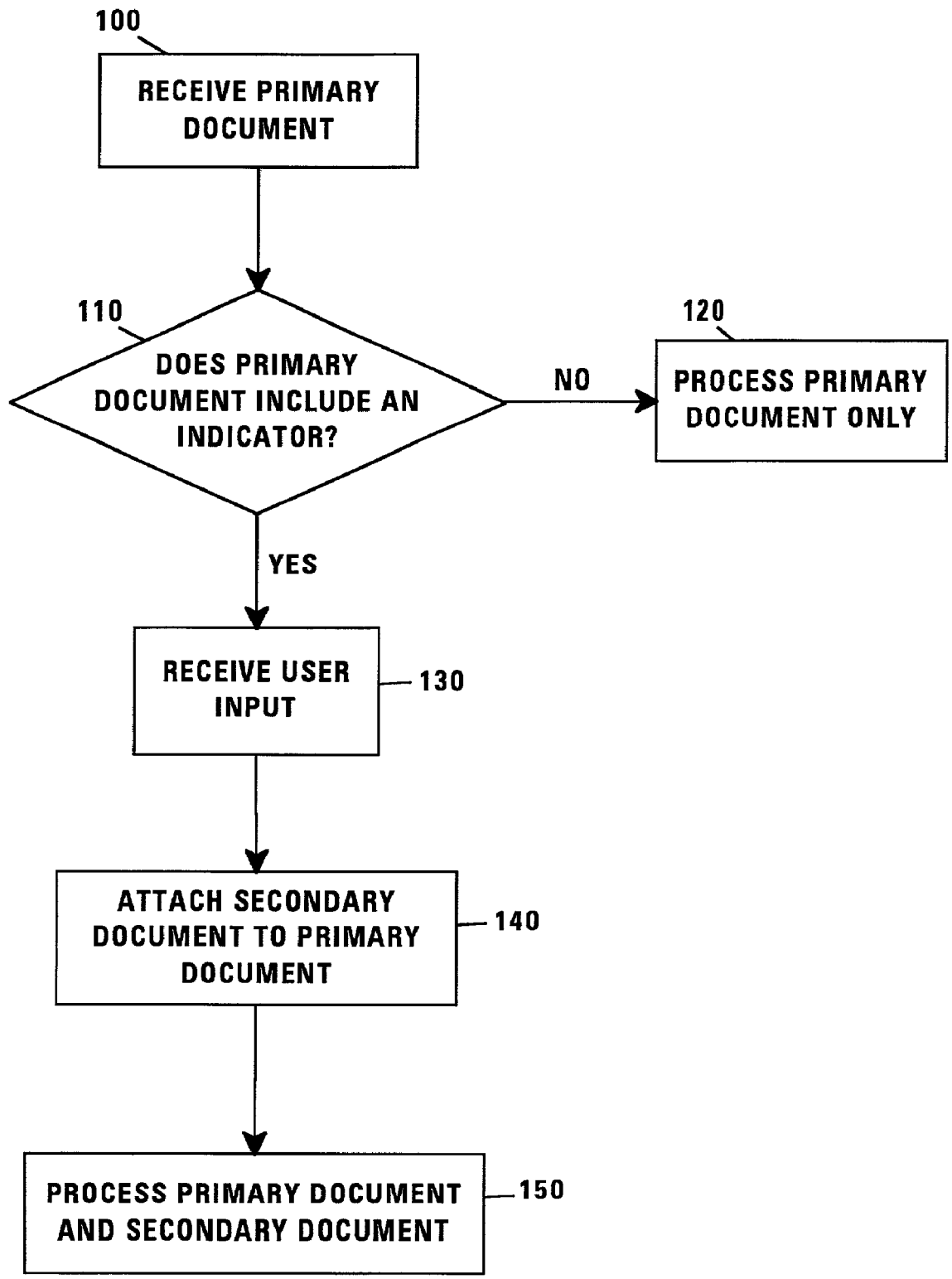
FIG. 2 is a flowchart depicting an exemplary method according to the present invention.

FIG. 2 is a first flowchart depicting an exemplary method according to the present invention. In a first step 100, processor 10 receives primary document 50 from first storage device 20. In a second step 110, processor 110 determines whether any of the plurality of words in the primary document 50 is an indicator included in the indicator table 70. If the result of the determination at step 110 is positive, then at step 130, processor 10 may then receive a user input indicating the filename and/or the location of secondary document 60. In step 140, processor 10 then attaches secondary document 60 to primary document 50 for further processing at step 150. If the result of the determination at step 110 is negative, then only primary document 50 is processed further at step 120.

Figure 3:
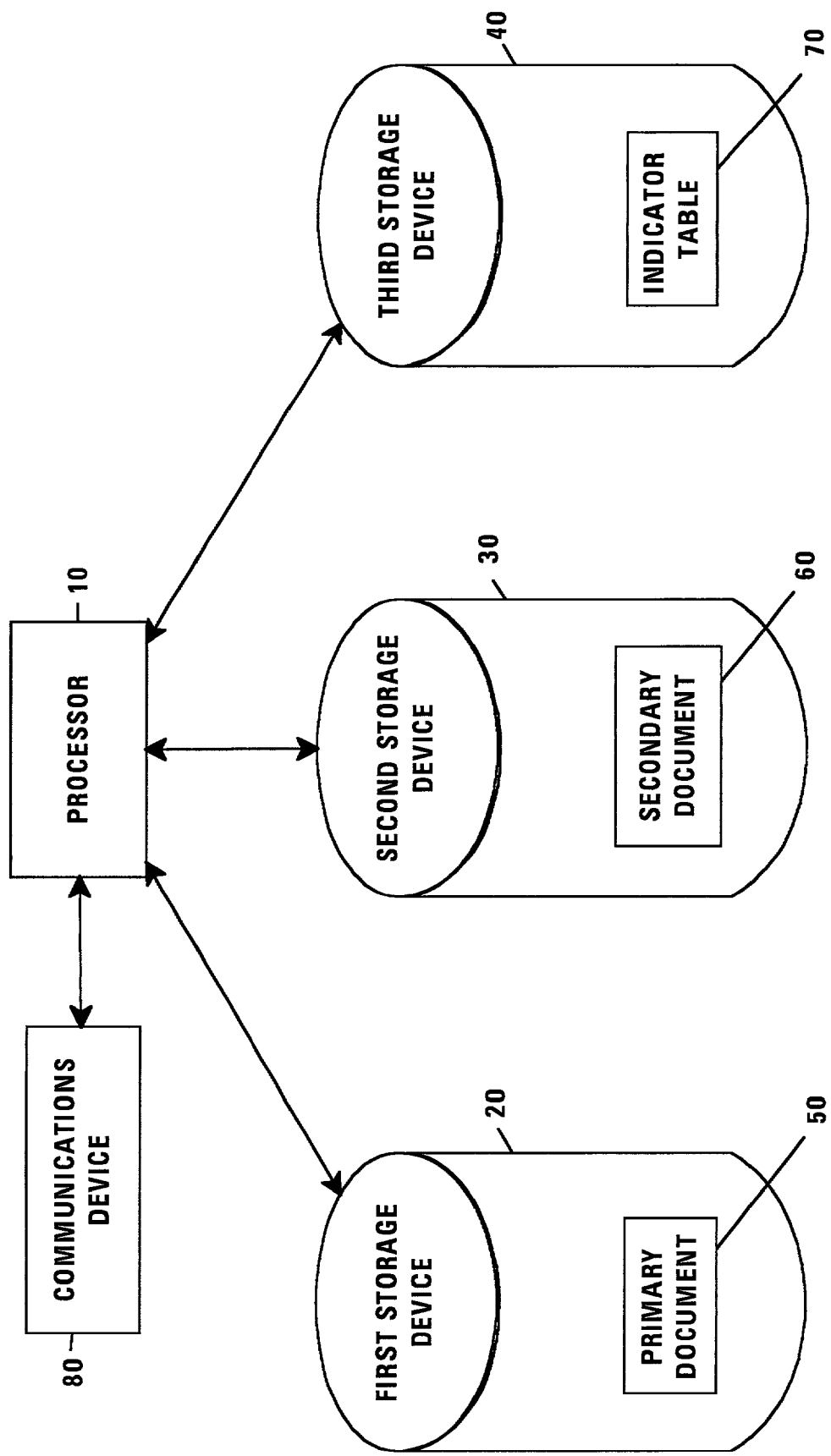
FIG. 3 shows an embodiment of a system for processing e-mail messages in accordance with the present invention.

FIG. 3 shows an embodiment of a system for processing e-mail messages in accordance with the present invention. In this embodiment, primary document 50 may be an e-mail message prepared by the user, and secondary document 60 may be an attachment file that the user would, in conventional systems, have to manually attach to the e-mail message before sending the e-mail message to a recipient via a communications device 80. Communications device 80 may include a modem, a network adapter, etc. Attachment file 60 may be, for example, a spreadsheet, a database, a graphics file, etc.

Typically, in preparing the e-mail message, the user will include a sentence that notifies the recipient of the existence of the attachment file. For example, the user may include a sentence in the e-mail message such as, "I have attached the budget file . . ." Thus, in this first embodiment, when processor 10 processes the e-mail message, the processor will automatically determine that the word "attached" is one of the entries in indicator table 70. Accordingly, this will indicate to processor 10 that a related document should be attached.

Alternatively, the user may include a predetermined character in primary document 50 that may not typically appear in a document. For example, the predetermined character may be an unprintable control character that will only be included in the document to indicate that a secondary document 60 should be attached.

Once processor 10 detects either type of indicator, processor 10 may then prompt the user to provide the filename and/or the location of the attachment file to attach to the e-mail message. Once the user provides the filename and/or the location of the attachment file, processor 10 may then attach the attachment file to the e-mail message using conventional document management techniques and then send the e-mail message with the attachment file to the recipient.

The processing by processor 10, i.e., detection and attachment, may be performed at any time during or after the creation of primary document 50. The user may be allowed to configure the time at which the processing is performed to suit individual preferences. The user may also be allowed to disable these processes so that the processor does not perform the detection and attachment at all until the user enables these processes at some later point. The system in accordance with the present invention may be implemented as an add-on program to existing conventional programs or be an additional feature incorporated into newer programs.

Figure 4:
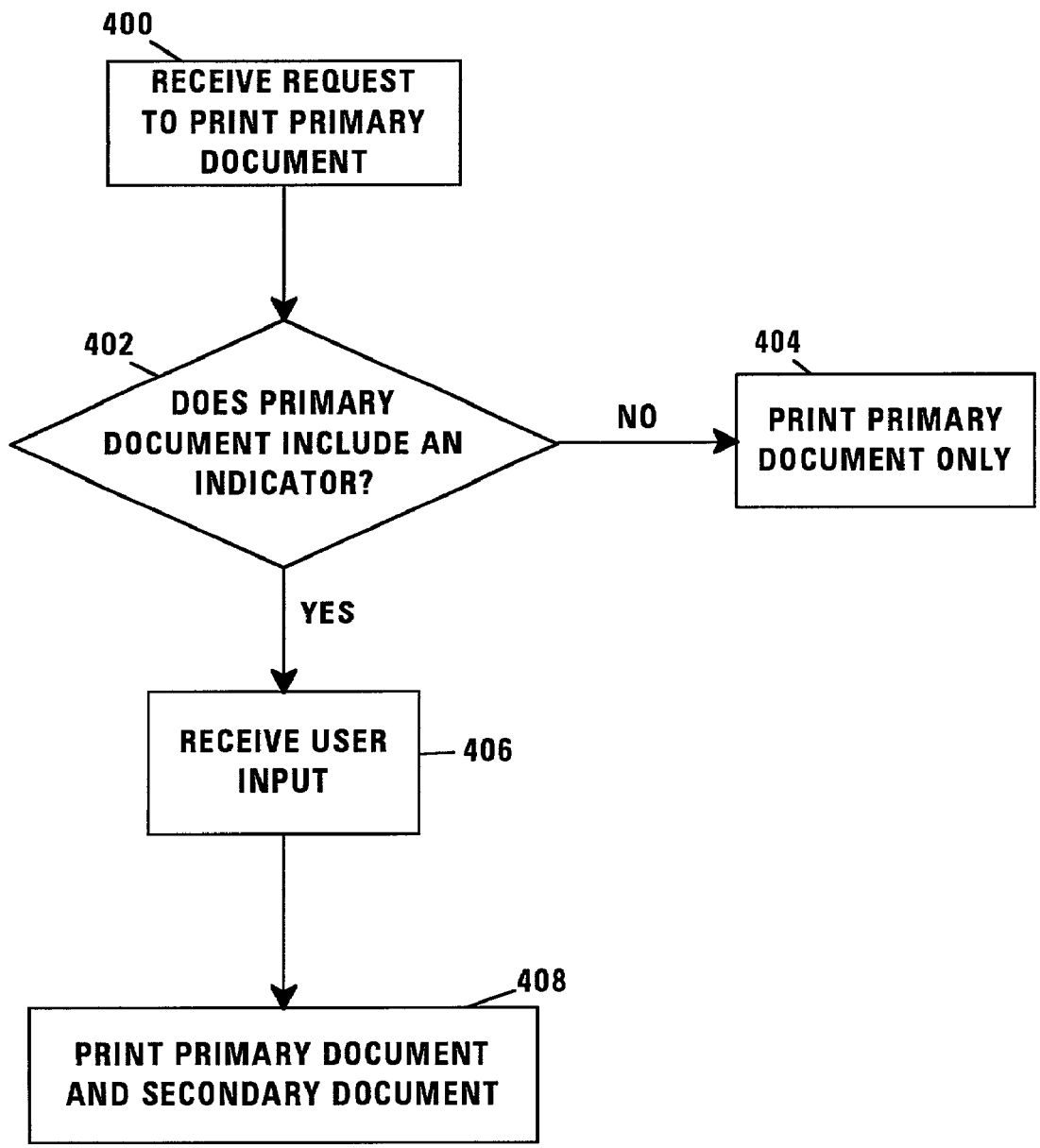
FIG. 4 shows a flow chart for an embodiment of a method for processing print requests in accordance with the present invention.

FIG. 4 shows a flow chart for an embodiment of a method for processing print requests in accordance with the present invention. At step 400, processor 10 receives a request to print primary document 50. At step 402, processor 10 processes primary document 50 to determine whether primary document 50 includes one of the plurality of indicators stored in indicator table 70. If the result of this determination is negative, then at step 404 processor 10 prints primary document 50 as in conventional systems. However, if the result of the determination at step 402 is positive, for example, primary document 50 may include, for example, the following sentence, "Please find enclosed the letter from . . ." Since primary document 50 contains the indicator "enclosed," then at step 404, processor 10 may then prompt the user whether to print another related document in addition to primary document 50. If the user responds affirmatively, then at step 406, processor 10 may receive a user input indicating the filename and/or the location of secondary document 60. Then at step 408, processor 10 prints both primary document 50 and secondary document 60. Those skilled in the art will appreciate that this second embodiment may also be used to process requests to send primary document 50 via a facsimile machine in addition to print requests.

In accordance with the present invention, indicator table 70 may also include phrases or sets of words, instead of individual words or characters, that are typically used to indicate that a related document should be attached. For example, some exemplary phrases may include "I (or We) have attached," "I (or We) have enclosed," "I (or We) have included," "Please find enclosed," "Attached is the file," etc. Detecting phrases such as these instead of individual words or characters should result in a reduction of "false-positives" that would occur in the previous embodiments. False-positives occur when the processor detects a word or character included in indicator table 70, but instead of being an indication of a related document, the word or character may merely be just another word in the document. For example, a sentence in primary document 50 may read, "The wheel is attached to the axle of the car." The previous embodiments would detect the word "attached" and determine that a related document should be attached, which would probably not be the case. However, this third embodiment would not determine that a related document should be attached since the phrase "The wheel is attached" would probably not be included in indicator table 70.

Figure 5:
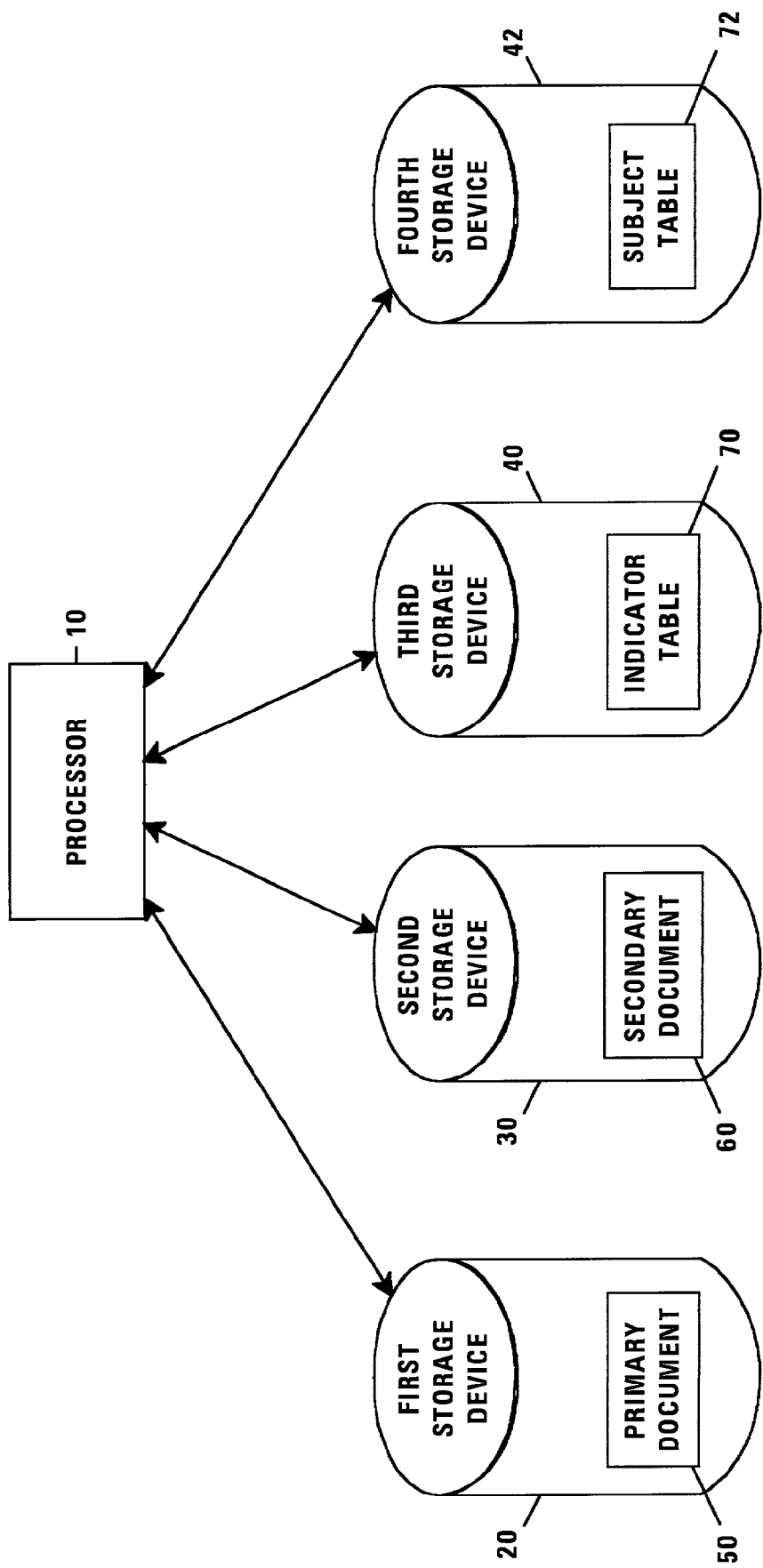
FIG. 5 shows an embodiment of the present invention.

FIG. 5 shows an improved embodiment of the present invention, which is similar to the system illustrated in FIG. 1. As in FIG. 1, this embodiment includes processor 10 coupled to first storage device 20, second storage device 30, third storage device 40 and a fourth storage device 42. As before, first storage device 20 may store primary document 50 having at least one word, the second storage device 30 may store secondary document 60 and third storage device 40 stores an indicator table 70. As in FIG. 1, indicator table 70 may contain words such as "attached," "enclosed," "included," etc. Fourth storage device 42 may store a subject table 72 of subject terms that are typically used to refer to the user or the user's company or organization, or any reference to the entity attaching the secondary document. Fourth storage device 42 may store, for example, the terms "I,"

"We," etc. As with the system of FIG. 1, the information stored in the various storage devices 20, 30, 40, 42 may alternatively be stored on a single storage device without departing from the scope of the present invention.

In this embodiment, processor 10 executes a set of instructions which utilizes syntactic processing (or natural language processing) to determine if a related document needs to be attached. Syntactic processing is not limited to a fixed set of predetermined words, characters or phrases. Instead, syntactic processing employs a technique similar to sentence diagraming, which processes entire sentences to determine the subject, verb and object of each sentence regardless of the writing style of the user, certain misspellings or any additional unanticipated words. This type of syntactic processing is currently utilized in certain language translation software such as, for example, Logos Corporations LOGOS-CA® program, etc.

Figure 6:
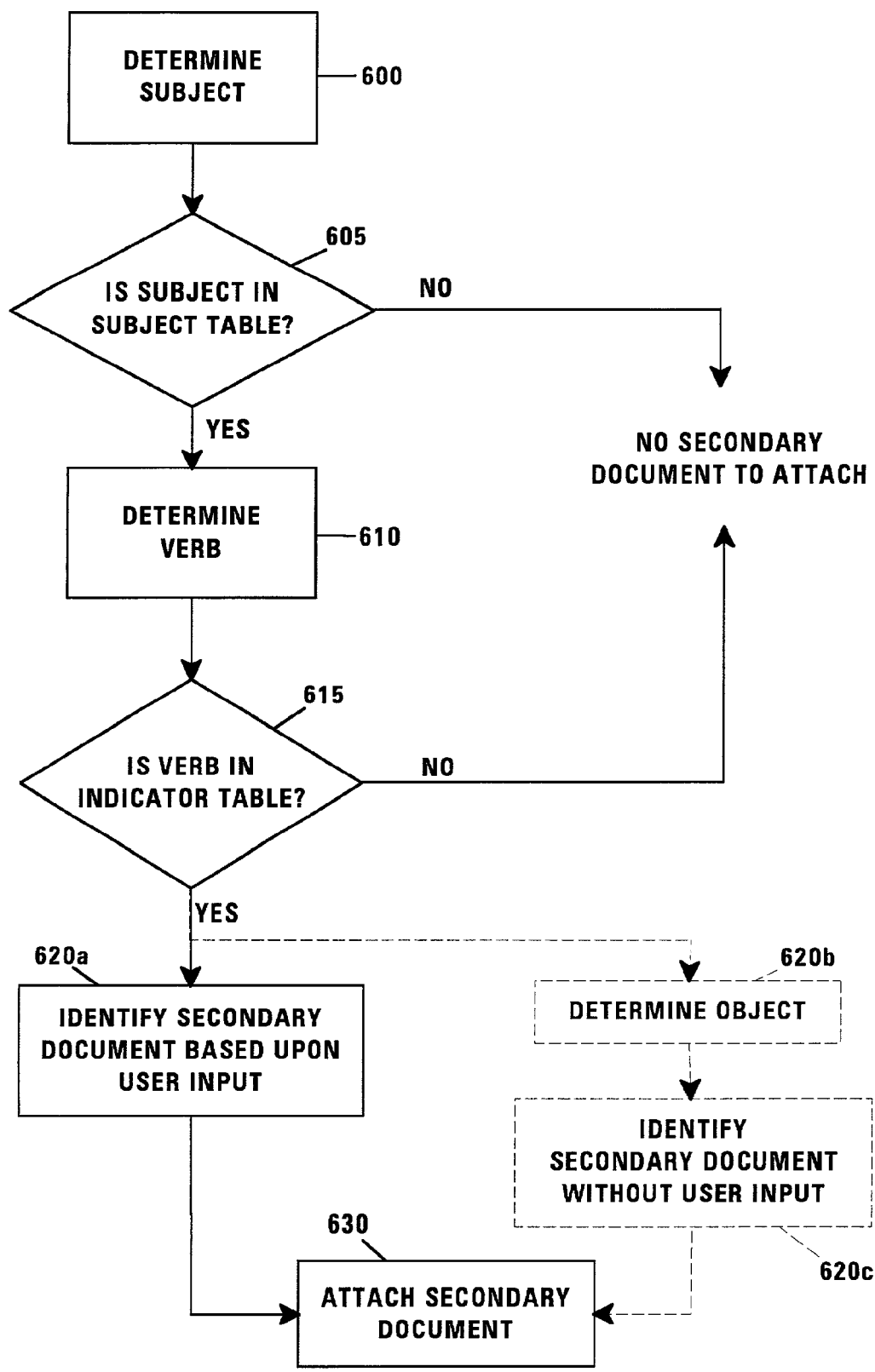
FIG. 6 shows a flowchart of an exemplary method for use in the fourth embodiment of FIG. 5.

FIG. 6 shows a flowchart of an exemplary method for use in the system of FIG. 5. At step 600, processor 10 determines the subject of a sentence in primary document 50. At step 605, processor 10 compares the determined subject to the subject terms stored in subject table 72. If the determined subject is not one of the subject terms in subject table 72, then it is assumed that no related document needs to be attached. If the determined subject is one of the subject terms, then at step 610, processor 10 determines the verb of the sentence. Of course, those skilled in the art will understand that processor 10 may determine the subject, verb and object simultaneously or in any order in accordance with the present invention, and that these steps are shown in this order for purposes of clarity and not to restrict the scope of the present invention. At step 615, processor 10 determines whether the determined verb is one of the terms stored in indicator table 70. If this is not the case, then it is assumed that no related documents needs to be attached. If the determined verb is one of the terms stored in indicator table 70, then at step 620a, processor 10 identifies secondary document 60 with the assistance of input by the user, as in the previous embodiments, and attaches secondary document at step 630.

In addition, there may be optional steps 620b and 620c that may be performed in place or in addition to step 620a, as shown in FIG. 6, in which processor 10 determines the object of the sentence at step 620b and then at step 620c, processor 10 makes a preliminary attempt to determine the filename and/or location of secondary document 60 without user input based upon the determined object. For example, if the determined subject and verb of the sentence is "I" and "have attached," respectively, and the determined object is an "e-mail," (i.e., if the phrase was "I have attached the e-mail regarding . . . ") there is a good probability that secondary document 60 may be an e-mail message located in the user's inbox (i.e., message storage directory). Furthermore, there is also a good probability that the e-mail to be attached may be related to primary document 50. More specifically, it may be common that the e-mail to be attached may have a similar subject header as primary document 50. Thus, processor 10 may process the files in the user's inbox to search for e-mails with similar subject headers as primary document 50, and present the user of attaching the e-mail with the most similar subject header. This may involve using probability matching algorithms that are used in systems such as, for example, web search engines, etc. Alternatively, processor 10 may merely direct the user to the user's inbox and prompt the user to indicate the specific e-mail to attach (of course, the user may then change the location if secondary document 60 is not in the inbox).

Figure 7:
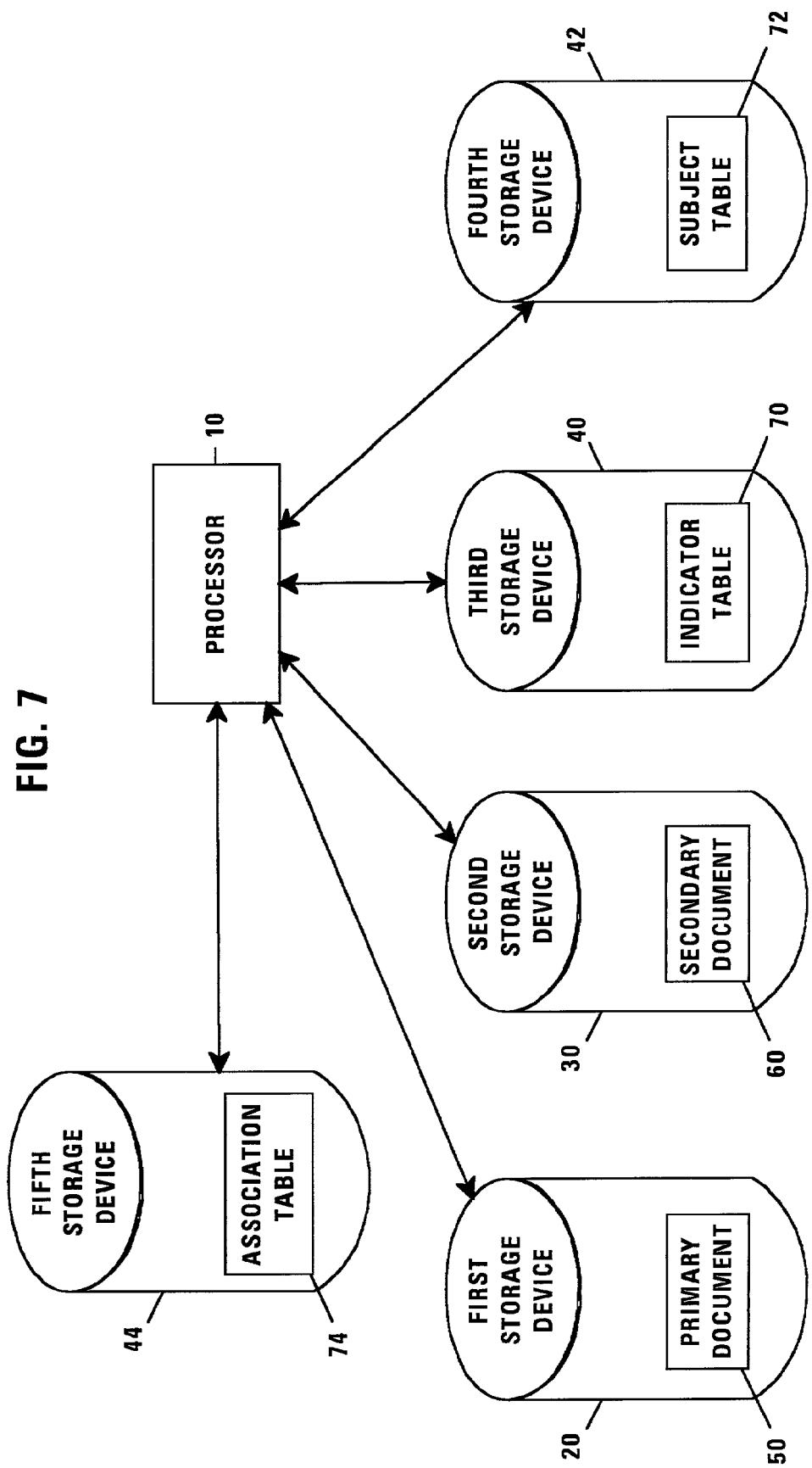
FIG. 7 shows an embodiment of the present invention.

The automatic determination of secondary document 60 may be further improved by using the system illustrated in FIG. 7, which is similar to the system illustrated in FIG. 5 except for an additional fifth storage device 44. This fifth storage device 44 may store an association table 74 created by the user that stores terms or phrases and corresponds them to the respective filenames and/or locations of the related documents. For example, association table 74 may associate the term "specifications file" with the file SPEC.DOC in a predetermined directory. Thus, whenever processor 10 determines that an object of the sentence is the "specifications file," processor 10 may prompt the user whether to attach the SPEC.DOC file to primary document 60, which would further refine the operation of the present invention. Of course, the information stored in the fifth storage device 44 may alternatively be stored on a single storage device along with the information stored on storage devices 20, 30, 40 and 42.

In addition to improving the efficiency and functionality of the embodiments shown in FIGS. 5 and 6, associations table 74 may also be used with any of the previous embodiments that do not even use syntactic processing to expedite the attachment process (FIGS. 1-5). For example, in the embodiment shown in FIG. 1, processor 10 may process the words in the same sentence as or within a predetermined proximity of the term that was found to be stored in indicator table 70. If any of these words are found in associations table 74, processor 10 may then use the associated filename and/or location to prompt the user if this filename and/or location is correct.

In a further exemplary embodiment of the present invention, the user may be allowed to add additional entries to any of the tables (e.g., indicator table 70, subject table 72 and associations table 74). Thus, the user may further personalize the system by adding slang terms, additional phrases, personalized references, nicknames or associations to the respective tables in accordance with the present invention.

In addition to attaching secondary document 60 to primary document 50, any of the embodiments discussed above may also be utilized to add other information to primary document 50 instead of, or in addition to, secondary document 60. For example, any of the previous embodiments may be implemented, with slight modifications, in the e-mail context to process primary document 50 in order to create a carbon-copy ("CC") list or add additional people to an existing CC list.

A CC list is a list of secondary recipients that should receive a copy of primary document 50 in addition to the primary recipient who will receive the "original" primary document 50. A common problem in the e-mail context is that a user may indicate in primary document 50 that a copy will be sent to another person, but forgets to create the CC list or forgets to include a specific secondary recipient.

Any of the previous embodiments may be implemented to solve this CC list problem using approaches similar to those discussed above with respect to attaching secondary document 50. One modification may be to change the indicators which are sought to be detected in primary document 50. Instead of words such as "attached," or phrases such as "I have attached," the indicators may include words or phrases indicating that a person/entity should be on the CC list, such as the term "CC" or phrase "I have CC'd." Another modification may be that mail directories and mailing lists will be searched for the appropriate e-mail address instead of searching for files once an indicator has been detected. A further modifications may be that, instead of or in addition to attaching secondary document 60, an e-mail address will be added to the list of secondary recipients.

In the foregoing description, the system and method according to the present invention has been described with reference to specific examples. It is to be understood and expected that variations in the principles of the system and method herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. A method comprising:
   processing a primary document in a computer system to locate an un-selected indicator;
   identifying a secondary document associated with said located un-selected indicator by said computer system; and
   attaching said secondary document to said primary document to encapsulate said secondary document within said primary document.

2. The method according to claim 1, wherein said unselected indicator includes at least one word, and wherein said identifying said secondary document is performed as a function of said at least one word.

3. The method according to claim 1, wherein said unselected indicator includes a plurality of words, and wherein said identifying said secondary document is performed as a function of said plurality of words within a predetermined proximity of said un-selected indicator included in said plurality of words.

4. The method according to claim 1, further comprising:
   associating a predetermined word with at least one of a filename and a location of said secondary document,
   wherein said primary document includes said predetermined word, and wherein identifying at least one of said filename and said location of said secondary document is performed as a function of said predetermined word.

5. The method according to claim 1, wherein said un-selected indicator includes at least one of a plurality of predetermined words, a plurality of predetermined characters, and a plurality of predetermined phrases.

6. The method according to claim 1, wherein processing said primary document to locate said un-selected indicator is performed using syntactic processing.

7. The method according to claim 1, wherein said primary document includes an e-mail message.

8. The method according to claim 7, further comprising sending said e-mail message and said secondary document attached thereto to a recipient via a communications device.

9. The method according to claim 1, further comprising sending said primary document and said secondary document attached thereto to a printing device.

10. The method according to claim 1, further comprising sending said primary document and said secondary document attached thereto to a recipient via facsimile.

11. The method according to claim 1, wherein said secondary document is attached to said primary document at a first instance, said first instance being determined as a function of user input.

12. The method according to claim 1, further comprising adding at least one additional indicator to said un-selected indicator as a function of a user input.

13. The method of claim 1, wherein said identifying said secondary document comprises using natural language processing techniques.

14. The method of claim 13, wherein said using natural language processing techniques, comprises at least one of:
   using word association processing; and
   using probability matching.

15. A document preparation system, comprising:
   a first storage device to store a primary document;
   a second storage device to store a secondary document;
   a third storage device to store an indicator; and
   a processor coupled to said first storage device, said second storage device and said third storage device, said processor to process said primary document to locate an un-selected indicator, identify said secondary document associated with said located un-selected indicator, and attach said secondary document to said primary document to encapsulate said secondary document within said primary document.

16. The system according to claim 15, wherein said secondary document has a filename and a location, wherein said primary document includes at least one word, and wherein said processor determines at least one of said filename and said location of said secondary document as a function of at least one of a user input and said at least one word.

17. The system according to claim 16, wherein a predetermined word is associated with at least one of said filename and said location of said secondary document, wherein said primary document includes said predetermined word, and wherein said processor identifies at least one of said filename and said location of said secondary document as a function of said predetermined word.

18. The system according to claim 15, wherein said un-selected indicator includes at least one of a plurality of predetermined words, a plurality of predetermined characters, and a plurality of predetermined phrases.

19. The system according to claim 15, wherein said processor determines if said primary document includes said indicator using syntactic processing.

20. A document preparation system, comprising:
   a storage device;
   a set of instructions stored on the storage device; and
   a processor to execute said set of instructions to perform a method to identify a secondary document having an un-specified location relative to a primary document, said method comprising:
      processing said primary document to locate an un-selected indicator;
      identifying a secondary document associated with said located un-selected indicator; and
      attaching said secondary document to said primary document to encapsulate said secondary document within said primary document.

21. The system according to claim 20, wherein said secondary document has a filename and a location, wherein said primary document includes at least one word, and wherein said processor determines at least one of said filename and said location of said secondary document as a function of at least one of a user input and said at least one word.

22. The system according to claim 20, wherein said un-selected indicator includes at least one of a plurality of predetermined words, a plurality of predetermined characters, and a plurality of predetermined phrases.

23. The system according to claim 20, wherein said processor determines if said primary document includes said indicator using syntactic processing.

24. A method comprising:
processing a primary document to locate an un-selected indicator, said primary document having a list of at least one address;
identifying an address of said recipient associated with said located un-selected indicator; and
attaching said address of said recipient to said list of said at least one address to encapsulate said address of said recipient within said primary document.

25. The method according to claim 24, wherein said un-selected indicator includes at least one of a plurality of predetermined words, a plurality of predetermined characters, and a plurality of predetermined phrases.

26. The method according to claim 24, wherein said primary document includes at least one address corresponding to at least one recipient to receive said primary document, further comprising attaching said address of said recipient to said list of said at least one address.

27. A document preparation system comprising:
a storage device storing a set of instructions;
a processor executing said set of instructions to identify an unspecified address of a recipient of a primary document, said primary document including a list of at least one address corresponding to at least one recipient to receive said primary document, by:
processing said primary document to locate an un-selected indicator, said primary document having a list of at least one address;
identifying an address of said recipient associated with said located un-selected indicator; and
attaching said address of said recipient to said list of said at least one address to encapsulate said address of said recipient within said primary document.

28. A method comprising:
processing a primary document to locate an un-selected indicator;
identifying a secondary document associated with said located un-selected indicator; and
automatically encapsulating said secondary document within said primary document upon identifying said secondary document.

29. The method of claim 28 wherein said identifying said secondary document associated with said located un-selected indicator comprising:
determining a filename of said secondary document; and
determining a location of said secondary document.

30. The method of claim 28 wherein said identifying said secondary document associated with said located un-selected indicator further comprising:
using syntactic processing of said primary document.

31. The method of claim 28 wherein said identifying said secondary document associated with said located un-selected indicator further comprising:
using a user input.

32. The method of claim 28 wherein said identifying said secondary document associated with said located un-selected indicator further comprising:
using a user selection.

33. The method of claim 28 wherein said processing said primary document to locate an un-selected indicator comprising:
using syntactic processing of said primary document.

34. The method of claim 28 wherein said processing said primary document to locate an un-selected indicator comprising:
processing said primary document to locate one of a plurality of pre-determined words.

35. The method of claim 28 wherein said processing said primary document to locate an un-selected indicator comprising:
processing said primary document to locate one of a plurality of pre-determined phrases.

36. The method of claim 28 wherein said processing said primary document to locate an un-selected indicator comprising:
processing said primary document to locate one of a plurality of pre-determined characters.

* * * * *